United States Patent [19] [11] 4,144,715
Fleck et al. [45] Mar. 20, 1979

[54] METHOD OF PRODUCING MECHANICAL ENERGY FROM GEOTHERMAL FLUIDS

[75] Inventors: Raymond N. Fleck, West Covina; Harvey Hennig, Fullerton, both of Calif.

[73] Assignee: Union Oil Company of California, Brea, Calif.

[21] Appl. No.: 827,237

[22] Filed: Aug. 24, 1977

[51] Int. Cl.² ............................................. F03G 7/00
[52] U.S. Cl. .......................................... 60/641; 60/649
[58] Field of Search ........................ 60/641, 649, 673; 165/45

[56] References Cited
U.S. PATENT DOCUMENTS

4,026,111  5/1977  Matthews ........................ 60/641
4,043,386  8/1977  Franz et al. ..................... 165/45
4,057,964  11/1977  Hutchinson .................... 165/45 X Primary Examiner—Allen M. Ostrager
Assistant Examiner—Stephen F. Husar
Attorney, Agent, or Firm—Richard C. Hartman; Dean Sandford; Daniel R. Farrell

[57] ABSTRACT

A method for producing mechanical energy from geothermal fluids in which a heat transfer fluid (HTF) is heated by direct contact with the hot geothermal fluids, thereby partially cooling the geothermal fluids. A working fluid is heated by direct contact with the partially cooled geothermal fluid and is heated further by indirect heat exchange with the hot HTF. The heated working fluid is utilized in a heat engine for the production of mechanical energy.

20 Claims, 3 Drawing Figures

METHOD OF PRODUCING MECHANICAL ENERGY FROM GEOTHERMAL FLUIDS

BACKGROUND OF THE INVENTION

1. Field of the Invention

The invention relates to a method for utilizing the thermal energy contained in subterranean formations to produce mechanical energy, and particularly to an improved method for utilizing the thermal energy of geothermal fluids to generate electricity.

2. Description of the Prior Art

Sources of geothermal energy are found in many parts of the world, and while a few of these sources provide dry steam which is particularly useful for the production of mechanical energy, and some provide wet steam, most of the known sources yield primarily hot geothermal brine. Because geothermal brines contain significant amounts of dissolved salts and suspended solids, past attempts to utilize these brines in the production of useful energy have been only of limited success due to the problems of scaling, plugging and corrosion of process equipment.

In one method for utilizing geothermal brine to produce mechanical energy, the hot geothermal brine is heat exchanged with a working fluid in conventional indirect heat exchange equipment in which the brine and working fluid directly contact the heat exchange surfaces of the heat exchanger. Due to the direct contact of these surfaces with the brine, extensive corrosion and fouling of the heat exchanger occurs and significantly reduces the efficiency of the heat exchange process.

U.S. Pat. No. 3,988,895 to Sheinbaum discloses the use of direct contact heat exchangers wherein the hot geothermal fluid is directly contacted with a secondary fluid. In one of the methods disclosed therein, the secondary fluid is vaporized in the direct contact exchanger and the hot vapor is utilized in a heat engine to produce mechanical energy. One problem with this method is that, because the direct contacting occurs at high temperatures in order to vaporize the secondary fluid, an appreciable amount of steam is flashed from the brine and is allowed to enter the heat engine with the vapors of the secondary fluid. The presence of appreciable quantities of steam and the attendant entrained solids and salts in the heat engine results in scaling and corrosion problems and is accordingly undesirable. However, since it is advantageous to have the vapors entering the heat engine at the highest possible temperature, the production of an appreciable quantity of steam cannot be avoided when using this method. In another method disclosed by Sheinbaum and also disclosed in U.S. Pat. No. 3,845,627 to Hutchinson, the hot secondary fluid is heat exchanged with a tertiary fluid in a conventional indirect heat exchanger. Although the introduction of steam to the heat engine is thus precluded, the scaling and corrosion due to the solids and salts entrained in the steam is merely transferred to the indirect heat exchangers.

In both of these prior art methods, the thermal energy extracted from the geothermal fluids is removed in a single direct contact heat exchange step and the residual geothermal fluid exhausted from that step still contains a large amount of unrecovered thermal energy. In attempting to maximize the thermal energy recovered from the geothermal fluid in the single heat exchange step, a significant amount of steam is flashed from the brine, thereby increasing the aforementioned difficulties.

In another proposed method the hot geothermal brine is contacted with a heat transfer fluid (HTF); the mixture is flowed cocurrently through a series of flash stages wherein the HTF is flashed to vapor in each flash stage; and a working fluid is flowed countercurrently through the series of flash stages in indirect heat exchange with the vapor produced in each flash stage. The heated working fluid is utilized in a heat engine for the production of mechanical energy. In order to be most effective, this method requires more than about 5 flash stages and therefore in particular circumstances, the method may not be the optimum energy production system.

Therefore, a need exists for a method which recovers a substantial portion of the thermal energy normally remaining in the residual fluids, while at the same time minimizes the amount of steam introduced to the heat engine and any indirect heat exchangers. A need exists for a flexible method for producing mechanical energy from hot geothermal fluids under a wide variety of operating conditions and which avoids the difficulties of the methods of the prior art described above.

Accordingly, a principal object of this invention is to provide a method for producing energy from geothermal brine in which the deleterious effects of corrosion, scaling and plugging due to steam, suspended solids and dissolved salts are avoided.

Another object of this invention is to provide a method for recovering the maximum amount of thermal energy from geothermal fluids in which the geothermal fluids do not contact a heat exchange surface.

Yet another object of this invention is to provide an improved method for recovering the thermal energy contained in hot geothermal fluids and for utilizing the recovered thermal energy to produce mechanical energy.

A further object of this invention is to provide a method for producing mechanical energy from geothermal fluids in which the amount of steam fed to the heat engine and/or allowed to contact a heat exchange surface is significantly reduced.

A still further object of this invention is to provide an improved method for producing mechanical energy from geothermal fluids which, through proper choice of a heat transfer fluid, a working fluid and operating conditions, can be successfully utilized to produce mechanical energy from a wide variety of geothermal fluids.

Further objects and advantages of this invention will be apparent to those skilled in the art from the following description taken in conjunction with the accompanying drawings.

SUMMARY OF THE INVENTION

Briefly, in the method of this invention hot geothermal fluid is produced from a subterranean geothermal reservoir; a heat transfer fluid (HTF) is heated by direct contact heat exchange with the hot geothermal fluid, thereby removing a substantial portion of the useable thermal energy and partially cooling the geothermal fluid; and a working fluid is preheated by direct contact heat exchange with the partially-cooled geothermal fluid and is further heated by indirect heat exchange with the HTF. The heated working fluid is utilized in a heat engine to produce mechanical energy.

Exemplary of the heat engines useful in the method of this invention are steam turbines, steam engines, gas turbines and other prime movers capable of using a heated working fluid to produce mechanical energy. In the most practical application of this invention, a turbine will be used to produce the mechanical energy to drive an electrical generator for the production of electricity.

In one preferred embodiment, the steam and noncondensible gases produced from the geothermal reservoir are separated from the produced brine in an initial separation step and are employed to vaporize and/or superheat the heated working fluid by indirect heat exchange prior to its entry into the heat engine, whereby the steam is condensed. The noncondensible gases are separated and the steam condensate is returned to the brine prior to its direct contact heat exchange with the HTF.

In another preferred embodiment, steam is separated from the geothermal brine in at least one flash stage; the HTF is heated by direct contact heat exchange with only the separated steam, thereby condensing the steam to form steam condensate; and the steam condensate is returned to the brine prior to its direct contact heat exchange with the working fluid.

The invention provides the important advantage that more of the useable thermal energy of the geothermal fluid is converted to mechanical energy and yet the geothermal brine is not allowed to directly contact a heat exchange surface. Another advantage is that mechanical energy can be produced from a wide variety of geothermal fluids and the amount of geothermal steam fed to the heat engine and/or indirect heat exchangers is minimized. A further advantage is that the working fluid can be heated to a temperature near the temperature of the produced geothermal fluid, thereby providing the recovered thermal energy at the highest possible temperature.

BRIEF DESCRIPTION OF THE DRAWINGS

The invention will be more readily understood by reference to the accompanying drawings wherein like numerals refer to like elements, in which.

DETAILED DESCRIPTION OF THE INVENTION

The method of this invention, as hereinafter described in greater detail, provides for the production of mechanical energy from geothermal fluids. The method involves first producing a hot geothermal fluid from a subterranean geothermal reservoir via one or more production wells. Geothermal reservoirs are found at varying depths, most ranging from 1,000 feet to 5,000 feet or deeper; and the temperature of the fluids contained therein can vary from ambient temperature to about 700° F. or higher, with many reservoirs containing fluids having temperatures in the range of 250° F. to 700° F. As used herein, the term "geothermal fluid" is meant to include both liquids and vapors produced from the geothermal reservoir, including steam, brine, noncondensible gases and steam flashed from the brine.

Several methods can be employed to deliver the geothermal fluid to the surface. Although the pressures within the geothermal reservoirs are high, they are often insufficient to cause the geothermal brine to flow naturally to the surface; therefore, either a surface or downhole pump may be required to produce the geothermal fluid. It may be desirable, once the flow of brine is initiated and the hotter brine is subjected to the lower pressures in the upper portion of the well, to allow the brine to partially flash to produce steam so as to help sustain the upward flow of the fluid. With whatever method is selected, a pressure control valve, in conjunction with a steam separator, may be used to control the pressure of the fluid produced at the surface and the amount of steam which is allowed to flash from the brine. Because allowing the brine in the production well to flash to produce steam results in a substantial decrease in the temperature of the geothermal fluid and the precipitation and deposit of minerals, and because it is preferred to produce as much brine as possible at the highest temperature with no precipitation of minerals, the amount of steam that is allowed to flash in the well should be kept to a minimum. Therefore, it is preferred to produce the hot geothermal fluid from the well at a superatmospheric pressure exceeding its vapor pressure to maintain the fluid in the liquid phase.

Once brought to the surface, if the pressure of the produced geothermal fluid is too high for use in the available heat exchangers, the brine can be partially flashed to steam prior to its introduction into the direct contact heat exchanger in order to reduce the pressure of the brine. The residual brine from the partial flashing can then be introduced into the first direct contact heat exchanger. In one embodiment of the method of this invention, the steam flashed or separated from the brine is condensed by indirect heat exchange with the working fluid prior to the entry of the working fluid into the heat engine, and the steam condensate obtained is mixed with the residual brine. Separation of the noncondensible gases from the steam condensate is facilitated by this step and the full thermal energy of the steam is utilized in heating the working fluid. The brine and steam condensate mixture is preferably conducted to the direct contact heat exchangers at a pressure exceeding its vapor pressure to maintain these fluids in the liquid phase. In a particularly preferred embodiment, the heat transfer fluid is selected and the geothermal fluid is pressurized sufficiently to assure that relatively little steam is allowed to flash from the geothermal fluid in the direct contact heat exchangers.

Figure 1:
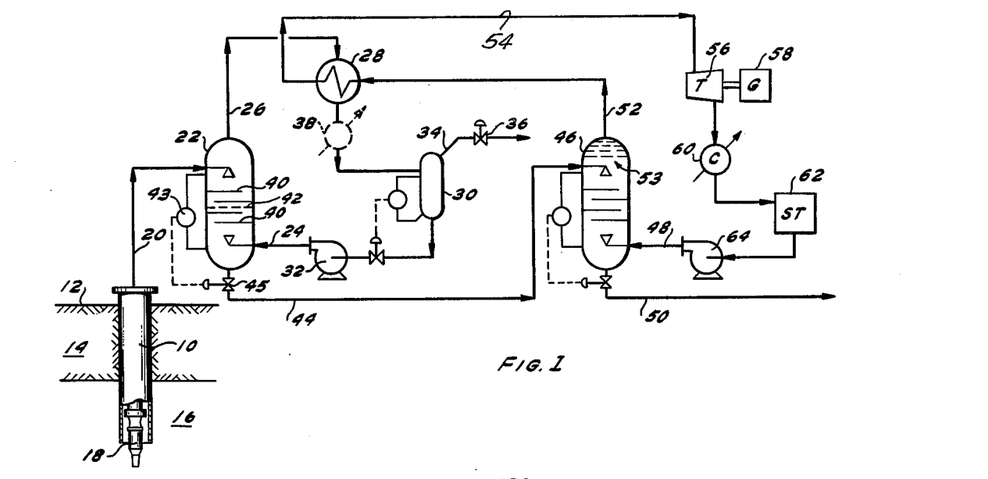
FIG. 1 is a schematic flow diagram of a process employing one embodiment of the method of this invention.

Referring now to the drawings, FIG. 1 illustrates one embodiment of the method of this invention. As shown in FIG. 1, geothermal production well 10 extends from the earth surface 12, through earth formation 14 and into geothermal reservoir 16, which contains a hot geothermal fluid. In those cases in which the geothermal fluid in reservoir 16 is primarily steam, formation 14 is typically of low permeability and serves as a "cap rock" to confine the steam within reservoir 16 and inhibit the diffusion of heat through the formation. In the cases where the geothermal fluid in reservoir 16 is primarily a liquid, a cap rock is not necessary to confine the geothermal fluid and often there is no cap rock. However, since the fluids near the earth surface are relatively cool, production well 10 is normally extended deeply into reservoir 16 in order to produce the hotter fluids.

The geothermal fluid is delivered to the surface through production well 10 by downhole pump 18, if required, and is maintained at a pressure exceeding its vapor pressure to prevent flashing of steam from the brine within the reservoir or in the production well. Downhole pump 18 serves to provide the necessary pressure to minimize flashing and maintain the geothermal fluid in the liquid phase. By preventing flashing in the well, heat losses can be kept to a minimum and the deposition of any substantial mineral deposits in the well can be prevented.

At the surface, the geothermal fluid is conducted by conduit 20 into the top of direct contact heat exchanger 22 wherein the geothermal fluid is contacted with a heat transfer fluid (HTF) which is introduced into the bottom of exchanger 22 through conduit 24. The HTF is heated as it flows upwardly through exchanger 22 and the hot HTF exits through conduit 26 at the top of exchanger 22. Depending on the HTF selected and the temperature and pressure of the contact step, the HTF will preferably exit from exchanger 22 as a liquid, a vapor-liquid mixture, or a saturated vapor. Since the introduction of any significant amount of steam into the HTF is undesirable, the pressure and temperature of exchanger 22 should be controlled to minimize steam production and, accordingly, the HTF exiting through conduit 26 will most preferably be a liquid or a vapor-liquid mixture. The hot HTF and any steam which is flashed from the brine are conducted by conduit 26 to indirect heat exchanger 28 wherein these fluids transfer their thermal energy to the working fluid and are consequently cooled and/or condensed. These cool fluids are conducted to separation vessel 30 which also serves as a surge tank for the HTF. The liquids, including the HTF and any steam condensate formed, are withdrawn from vessel 30 by pump 32 and recycled to exchanger 22 via conduit 24. Noncondensible gases and any steam accumulated in vessel 30 can be conducted through conduit 34 to the atmosphere or a gas treatment plant, not shown. The flow through conduit 34 is controlled by control valve 36. If the geothermal fluid contains a significant quantity of noncondensible gases, these gases can be vented through conduit 34 and optionally condenser 38 is provided to fully condense all the condensible vapors to improve the separation of the noncondensible gases from the condensible HTF and steam.

Direct contact heat exchanger 22 may be of conventional design with a plurality of alternating contact trays 40 protruding from opposite sides of exchanger 22 to break up the flow of the fluids and to increase the contact between the fluids being contacted and thereby improve the heat exchange. Direct contact heat exchangers are liquid/liquid or liquid/vapor contacting devices which are well known in the art. The selection and use of these contacting devices for heat exchange between a geothermal fluid and a secondary fluid is disclosed by Steinbaum in "Direct Contact Heat Exchangers in Geothermal Power Production," *Geothermal Energy Magazine*, August, 1975, pp 13–21, which is herein incorporated by reference. A HTF liquid/geothermal liquid interface, shown as dotted line 42 may be formed, although usually not sharply defined, at some vertical location in exchanger 22, which location depends primarily upon the relative flow rates of the fluids being contacted. The flow of geothermal brine from exchanger 22 is preferably controlled by a control valve adjusted by a level controller responsive to the HTF/brine interface. In the embodiments of this invention wherein the organic fluid being contacted is vaporized in the direct contact exchanger, a vapor/liquid interface may also be formed and it is preferred that the entering geothermal fluid be introduced at a point below the vapor/liquid interface in the exchanger because this will serve to minimize entrainment of the brine in the HTF vapors.

The geothermal fluid remaining in the liquid phase, i.e. all but a minor amount of steam, flows downwardly through exchanger 22 and is partially cooled. The flow of partially cooled fluid from exchanger 22 is automatically controlled by level controller 43 which operates control valve 45. A conduit 44 conducts the partially-cooled geothermal fluid into the top of direct contact heat exchanger 46 wherein the geothermal fluid is contacted with a working fluid introduced into the bottom of exchanger 46 through conduit 48. The geothermal fluid is further cooled as it flows downwardly through exchanger 46 and exits through conduit 50 on level control. Conduit 50 conducts the cool geothermal fluid to a reinjection well, minerals recovery plant or other disposal site, not shown.

The working fluid is heated as it flows upwardly through exchanger 46 and the heated working fluid exits through conduit 52 at the top of exchanger 46. Depending upon the composition of the working fluid and the temperature and pressure in exchanger 46, the working fluid will preferably exit from exchanger 46 as a liquid, a vapor-liquid mixture or a saturated vapor. The primary purpose of the direct contact between the working fluid and the partially-cooled geothermal fluid is to preheat the working fluid and recover residual thermal energy from the geothermal fluid. Since the introduction of any significant amount of steam into the working fluid is undesirable, the pressure and temperature of the exchanger 46 will be controlled to minimize steam production and, accordingly, the working fluid exiting through conduit 52 will most preferably be a liquid or a vapor-liquid mixture. If any vapor is produced in exchanger 46, one or more wash trays, shown generally as 53, are preferably provided to scrub the vapor to prohibit passage of entrained solids or salts into conduit 52. Functionally, exchanger 46 is essentially the same as exchanger 22 described above.

Conduit 52 conducts the working fluid to heat exchanger 28 wherein the working fluid is further heated by indirect heat exchange with the heat transfer fluid. Conduit 54 conducts the heated working fluid to turbine 46, or other heat engine. The heated working fluid expands in turbine 56 and thereby produces mechanical energy to drive generator 58. The expanded working fluid is cooled and/or condensed in condenser 60 and the cooled working fluid is conducted to surge tank 62. Pump 64 recycles the condensed working fluid and any steam condensate from tank 62 to exchanger 46 via conduit 48.

Briefly, the thermal energy of the hot geothermal fluid is transferred to the working fluid by a series of heat exchange steps including a preheating of the working fluid by direct contact heat exchange with the geothermal fluid and further heating and/or vaporization of the preheated working fluid by indirect heat exchange with a heat transfer fluid which in turn has been heated by direct contact heat exchange with the geothermal fluid. It is critical to the method of this invention that a significant portion of the thermal energy is extracted from the geothermal fluid by direct contact with the HTF. Preferably between about 10 and about 60 percent of the thermal energy recovered from the geothermal fluid is recovered during its direct contact with the HTF. Recovery of between about 15 and about 40 percent of the thermal energy by the HTF is particularly preferred. By extracting a significant portion of the energy in this step, the geothermal fluid is sufficiently cooled to minimize the amount of steam which will be flashed from the brine during the direct contact heat exchange of the partially cooled geothermal fluid with the working fluid and therefore the amount of steam introduced into the heat engine is minimized. However, the amount of thermal energy recovered by the HTF should not be so large that an appreciable amount of steam is introduced into the HTF stream and therefore into contact with the heat exchange surface of the indirect heat exchanger.

The amount of steam introduced into each of the HTF and working fluid streams should be minimized and can be controlled by proper selection of a HTF, a working fluid and operating conditions, such as the system pressure, for a particular geothermal reservoir. The selection of a particular embodiment of the method of this invention for a given geothermal reservoir is a matter of choice dependent on well-known engineering principles and will be obvious to one skilled in the art from this description and the examples.

The heat transfer fluid used in the method of this invention can be any of a variety of fluids, but the HTF must be substantially immiscible with the geothermal brine and it is preferred that the HTF have a lower specific gravity than the brine. Additionally, low solubility of the HTF in the brine is desired since any solubilized HTF will be removed from the system and the system would require chemical makeup and/or a subsequent treatment of the brine to remove the solubilized HTF. The HTF may be a liquid at all the temperatures and pressures encountered or, as disclosed above, it can be a boiling liquid which is vaporized when heated by direct contact with the geothermal fluid and is condensed by indirect heat exchange with the working fluid. Thus the boiling point of the heat transfer fluid can be higher, the same or lower than the boiling point of the geothermal brine. Exemplary non-boiling heat transfer fluids, herein referred to as "hot oils", include normally liquid paraffinic hydrocarbons and other organic compounds immiscible with the brine. Particularly preferred paraffinic hydrocarbons are the normally liquid alkanes having 5 or more carbon atoms per molecule. Also preferred are the high boiling naphthas and gas oils, which do not vaporize under the temperatures and pressures encountered. The paraffinic hydrocarbons, and especially the alkanes, are preferred due to their low solubility in geothermal brine. The classification of a particular hydrocarbon as either a boiling liquid or a hot oil will of course depend upon the temperature and pressure in the direct contact stage. For example, at relatively high temperatures pentane will be a boiling liquid but at lower temperatures and the same pressure, it will be a hot oil as defined herein. Exemplary boiling liquid heat transfer fluids include low molecular weight hydrocarbons, particularly alkanes having between 3 and 6 carbon atoms per molecule, such as propane, butane, isobutane, pentane, isopentane and hexane. Although mixtures of these components can be employed, relatively pure, single component heat transfer fluids are preferred in order that the HTF vaporizes at a relatively constant temperature which is dependent on the pressure. Particularly preferred hot oils are naphthas and gas oils having normal boiling points between about 300° F. and about 700° F. and a boiling point range of less than 50° F. and preferably less than 25° F. Particularly preferred HTF boiling liquids are n-butane, isobutane and n-pentane.

The working fluid can also be any of a wide variety of fluids which are relatively immiscible with the geothermal brine and have lower specific gravities than the brine. Low solubility of the working fluid in the brine is desired since any solubilized working fluid will be removed from the system and the system would require chemical makeup and/or subsequent treatment of the brine to remove the solubilized material. The working fluid can be a liquid at all temperatures and pressures encountered, but preferably is a boiling liquid which vaporizes prior to entry into the heat engine and is condensed therein or after exiting from the heat engine. Thus the boiling point of the working fluid can be higher, the same or lower than the boiling point of the geothermal brine. The preferred boiling liquid working fluids have lower boiling points than the geothermal brine and preferably the working fluid is selected such that its vapor pressure at any temperature is substantially higher than the vapor pressure of the partially-cooled geothermal brine with which it is contacted, so that the amount of steam introduced into the working fluid is minimized. Exemplary boiling liquid working fluids include low molecular weight paraffinic hydrocarbons, particularly alkanes having between 3 and 6 carbon atoms per molecule, such as propane, butane, isobutane, pentane, isopentane and hexane. Although mixtures of these components can be employed, essentially single component fluids are preferred if any significant amount of the working fluid will be vaporized during the direct contact heat exchange with the geothermal fluids in order that the working fluid vaporizes at a relatively constant temperature which is dependent on the pressure. Where the working fluid will not be more than partially vaporized but merely preheated during the direct contact heat exchange with the geothermal fluids and will subsequently be vaporized by the indirect heat exchange with the HTF, a multicomponent working fluid is preferred. A multicomponent fluid, as defined herein, is a mixture of two or more fluids which boils over a range of temperatures, boiling beginning at its bubble point and vaporization being complete at its dew point. Because the temperature of the multicomponent fluid continuously increases as the fluid boils rather than undergoing a period of constant temperature boiling, a more uniform temperature differential between the HTF and the working fluid in the indirect heat exchanger can be maintained, thereby allowing the working fluid to be heated to a higher temperature. Conversely, because a multicomponent fluid condenses over a range of decreasing temperatures rather than at a constant temperature, thereby providing a more uniform temperature differential between it and the cooling fluid, the amount of cooling fluid required and the size of the condenser can be reduced. Exemplary multicomponent fluids include mixtures of the low molecular weight paraffinic hydrocarbons, particularly mixtures of the alkanes having between 3 and 6 carbon atoms per molecule. Particularly preferred multicomponent fluids include a mixture of butane and pentane, such as a 50/50 mixture, and a mixture of propane, isobutane and isopentane, such as a 25/50/25 percent mixture. The working fluid and heat transfer fluid will be selected for optimum performance in view of the available geothermal fluid temperature and pressure.

Figure 2:
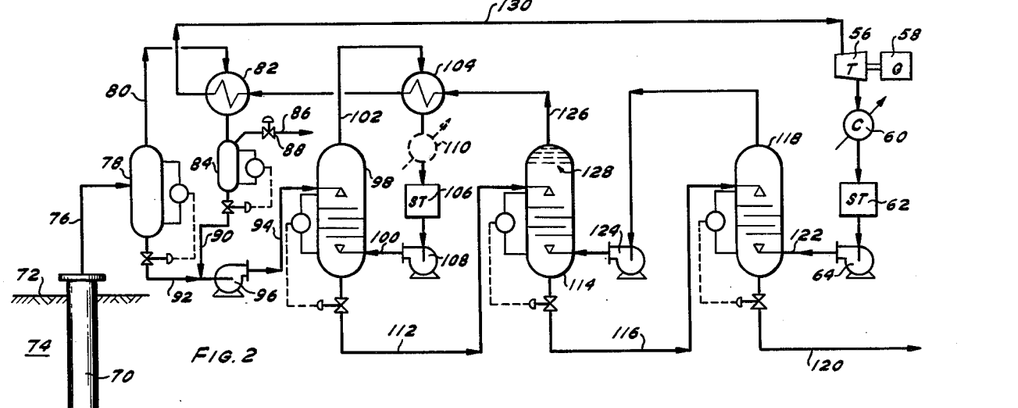
FIG. 2 is a schematic flow diagram of a process employing a preferred embodiment of the method of this invention.

One preferred embodiment of the method of this invention is illustrated in FIG. 2, wherein geothermal production well 70 extends from the earth surface 72 into geothermal reservoir 74 which contains a hot geothermal fluid. The hot geothermal fluid is conducted from production well 70 by conduit 76 to separation vessel 78 wherein the steam and noncondensible gases are separated from the brine. The vapors exit from the top of separator 78 through conduit 80 and are passed through indirect heat exchanger 82, wherein the condensible gases are condensed, and into separation vessel 84. The noncondensible gases accumulated in vessel 84 can be vented by means of control valve 88 through conduit 86 to the atmosphere or a gas treatment plant, not shown. Optionally a condenser, not shown, can be provided between exchanger 82 and vessel 84 to condense additional vapor thus aiding in the separation of noncondensibles. The steam condensate from vessel 84 is conducted through conduit 90 and is mixed with the geothermal brine conducted from separator 78 by conduit 92. This fluid mixture is conducted by conduit 94 into the top of direct contact heat exchanger 98 and preferably is pressurized by pump 96 to prevent subsequent flashing of steam from the brine.

The operation and design of exchanger 98 is the same as the direct contact heat exchangers discussed above. A heat transfer fluid (HTF) is introduced into exchanger 98 through conduit 100 and flows upwardly through exchanger 98 wherein it is heated as it extracts a substantial portion of the thermal energy from the hot geothermal fluid. The hot HTF exits from the top of exchanger 98 through conduit 102 and is passed through indirect heat exchanger 104, wherein it is cooled by heat exchange with the working fluid, and then is conducted to surge tank 106. The HTF is recycled from surge tank 106 to exchanger 98 by pump 108. The HTF can be a liquid throughout the HTF loop or it can be vaporized in exchanger 98 and condensed in exchanger 104. Optionally, condenser 110 can be provided to further cool the HTF, if required.

The partially cooled geothermal fluid exits from the bottom of exchanger 98 and is conducted by conduit 112 into the top of direct contact heat exchanger 114 wherein the partially cooled geothermal fluid is contacted with a working fluid. In the preferred embodiment shown the partially cooled geothermal fluid and working fluid are contacted in two separate direct contact stages. After flowing downwardly through exchanger 114, the geothermal fluid is conducted by conduit 116 into the top of direct contact heat exchanger 118. The geothermal fluid removed from the bottom of exchanger 118 is conducted by conduit 120 to a reinjection well or other disposal site, not shown. A working fluid is introduced into the bottom of exchanger 118 by means of conduit 122, and flows upwardly through exchanger 118 where it is preheated by direct contact with the partially-cooled geothermal fluid. The preheated working fluid is pumped from the top of exchanger 118 by booster pump 124 and into the bottom of exchanger 114, wherein the working fluid is further heated by a second stage of direct contact with the geothermal fluid. The use of two separate direct contact stages allows more complete recovery of the thermal energy of the geothermal fluid. The working fluid is pumped from exchanger 118 as a liquid and, in one preferred embodiment, is partially vaporized in exchanger 114, and exits through conduit 126 as a vapor-liquid mixture. Optionally, wash trays, shown generally as 128, are provided to scrub entrained salts and solids from the working fluid.

The heated working fluid is then further heated and preferably vaporized by indirect heat exchange with the HTF in exchanger 104 and with the separated steam in exchanger 82. Preferably the working fluid exits from exchanger 82 as a superheated vapor. The vapor is conducted by conduit 130 to turbine 56. Expansion of the vapor in turbine 56 produces mechanical energy which drives generator 58. The working fluid exhausted from turbine 56 is condensed in condenser 60 and stored in surge tank 62. The working fluid is recycled from surge tank 62 to exchanger 118 by pump 64.

Figure 3:
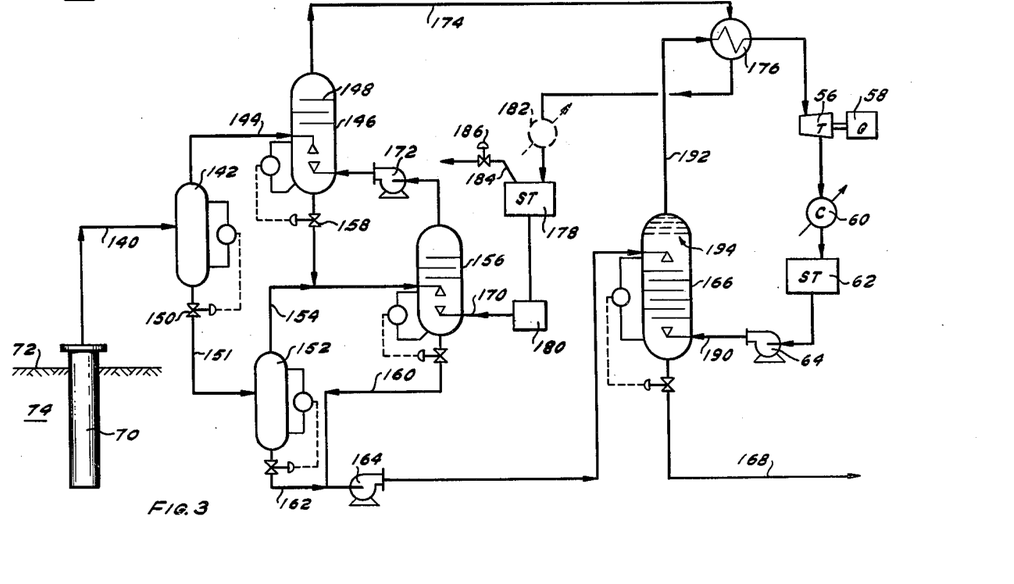
FIG. 3 is a schematic flow diagram of a process employing another preferred embodiment of the method of this invention.

In another preferred embodiment of the method of this invention, illustrated in FIG. 3, hot geothermal fluid is conducted from a geothermal reservoir 74 by production well 70 and conduit 140 into flash vessel 142 to separate steam from the hot brine. The steam is conducted from vessel 142 by conduit 144 and into the bottom of direct contact heat exchanger 146 wherein the steam is condensed by direct contact with a heat transfer fluid. Exchanger 146 is similar in construction to the other direct contact heat exchangers described above, however because the entering geothermal fluid is a vapor and, therefore, is less dense than the HTF, it is introduced at a lower point in the exchanger and the heat exchange is a combination of co- and counter-current heat exchange, i.e. as the steam rises with the HTF it is cooled and condensed and the steam condensate, which is denser than the HTF, will sink to the bottom of exchanger 146. A plurality of trays 148 are provided at the top of exchanger 146 to promote better contacting between the steam and the HTF.

The brine from vessel 142 is conducted by conduit 151 through automatic level control valve 50 and into flash vessel 152 to flash additional steam from the brine, thereby partially cooling the brine. This steam is conducted from vessel 152 by conduit 154 and into the bottom of direct contact heat exchanger 156 wherein it is condensed by direct contact with the HTF. Preferably the steam condensate accumulated in exchanger 146 is passed through automatic level control valve 158 and mixed with the steam in conduit 154 prior to entry into exchanger 156. The steam condensate from exchanger 156 is conducted through conduit 160 and is mixed with the partially cooled brine removed from vessel 152 through conduit 162. The partially-cooled geothermal fluid is preferably pressurized by pump 164 to a pressure above the vapor pressure of the fluid and introduced into the top of direct contact heat exchanger 166 wherein it is contacted with a working fluid. After flowing downwardly through exchanger 166, the cooled geothermal fluid is conducted from the bottom of exchanger 166 on level control through a conduit 168 to a reinjection well or other disposal site, not shown.

In this embodiment, the HTF selected preferably is a hot oil, i.e., the HTF remains substantially in the liquid state at the temperature and pressures encountered in the direct contact heat exchanger. The HTF is introduced into the bottom of exchanger 156 through conduit 170 and, after contacting the geothermal steam, is pumped from the top of exchanger 156 by booster pump 172 into the bottom of exchanger 146. The heated HTF, any noncondensible gases and a minor amount of steam are conducted from the top of exchanger 146 by conduit 174 to indirect heat exchanger 176 and are cooled and- /or condensed therein. The cooled fluid enters surge tank 178 and the liquid is recycled to exchanger 156. Optionally, the fluid from exchanger 176 can be further cooled and/or condensed in condenser 182 before entry into tank 178. Noncondensible gases accumulated in tank 178 can be vented through conduit 184 which is controlled by valve 186. The fluid pressure in surge tank 178 may be less than the pressure in exchanger 156, in which case a pump, shown generally as element 180, must be provided to pump the HTF into exchanger 156. However, often the fluid pressure in tank 178 will be higher than the pressure in exchanger 156, in which case element 180 will be a pressure reducing valve or, preferably, a power recovery turbine to throttle the flow of the HTF.

The working fluid is introduced into the bottom of exchanger 166 through conduit 190 and is heated as it flows upwardly through exchanger 166. Preferably the working fluid is at most only partially vaporized in exchanger 166 and exits from the top of exchanger 166 through conduit 192 as a liquid or a vapor-liquid mixture. Optionally, wash trays, shown generally as 194, are provided to scrub entrained salts and solids from any vapor which is formed.

The heated working fluid is then further heated by indirect heat exchange with the HTF in exchanger 176 and preferably is thereby heated to a saturated or a superheated vapor. The vapor is conducted to turbine 56. Expansion of the vapor in the turbine produces mechanical energy which drives generator 58. The working fluid exhausted from turbine 56 is condensed in condenser 60 and the condensate is stored in surge tank 62. The working fluid is recycled from tank 62 to exchanger 166 by pump 64.

The invention is further described by the following examples which are illustrative of specific modes of practicing the invention and are not intended as limiting the scope of the invention as defined by the appended claims.

EXAMPLE 1

Hot geothermal brine is produced from a geothermal reservoir via a production well and is processed in accordance with the method of this invention and substantially in accordance with the flow diagram illustrated in FIG. 1. The brine is pressurized by downhole pump 18 and is introduced into direct contact heat exchanger 22 at a temperature of 350° F. and a pressure of about 500 psia. In exchanger 22 the brine is directly contacted with a n-pentane heat transfer fluid (HTF), thereby heating the HTF and partially cooling the brine. In this step, about 20 percent of the recoverable thermal energy of the brine is transferred to the HTF. The pressure in exchanger 22 and the composition of the HTF have been selected so that a minor amount of HTF is vaporized in exchanger 22 in order to facilitate the removal of noncondensible gases from the brine. The fluid taken overhead from exchanger 22, which comprises about 5 percent HTF vapor and less than 0.5 percent by weight of steam with the remainder being HTF liquid, is conducted to indirect heat exchanger 28 wherein its thermal energy is transferred through a heat exchange surface to the working fluid. The HTF is separated from the noncondensible gases in separator 30 and is recycled to exchanger 22 by pump 32.

The partially-cooled brine exists from exchanger 22 at about 300° F. and is conducted to direct contact heat exchanger 46 wherein it is contacted with an isobutane working fluid at about 500 psia. The remainder of the recoverable thermal energy of the brine is transferred to the working fluid and the cool brine, at about 120° F., is conducted from the bottom of exchanger 46 to an injection well.

The working fluid exits from exchanger 46 as a liquid of about 268° F. and is subsequently vaporized and heated to about 280° F. by indirect heat exchange with the HTF in exchanger 28. The working fluid which contains essentially no geothermal fluid is expanded through turbine 58, thereby producing the mechanical energy to drive generator 58. After being condensed in condenser 60, the working fluid is eventually recycled to exchanger 46 by pump 64.

EXAMPLE 2

Saturated geothermal brine at a bottomhole temperature of about 500° F. is produced from a geothermal reservoir via a production well and is processed in accordance with an embodiment of the method of this invention which is substantially in accordance with the flow diagram illustrated in FIG. 3. The brine is flowed naturally to the earth surface and partial flashing of the brine to produce steam assists the flow. The hot geothermal fluids are delivered to flash vessel 142, which is maintained at a pressure of about 390 psia and wherein the flashed steam is separated from the brine. The separated steam at about 400° F. is conducted to direct contact heat exchanger 146 wherein it is cooled and condensed by direct contact with the heat transfer fluid. The HTF is a paraffinic, heavy naphtha fraction which has a normal boiling range of between 290° and 310° F.

The brine from flash vessel 142 is conducted to flash vessel 152 which is maintained at about 136 psia and wherein additional steam is flashed from the brine. The steam condensate accumulated in exchanger 146 is removed from the bottom thereof through valve 158 and is mixed with the steam from vessel 152. This mixture is then conducted to direct contact heat exchanger 156 wherein it is cooled and condensed by direct contact with the HTF. In this manner, about 38 percent of the recoverable thermal energy of the hot geothermal fluids is removed by the HTF.

The HTF is preheated in exchanger 156 and further heated in exchanger 146 to about 400° F. The hot HTF is conducted to indirect heat exchanger 176 for heat exchange with the working fluid and is eventually recycled to exchanger 156. The pressures of exchangers 156 and 146 and the composition of the HTF are selected so that essentially no vapor remains uncondensed in exchanger 156, and subsequently the HTF is only partially vaporized in exchanger 146. The fluid leaving the top of exchanger 146 is composed of less than 1 percent by weight total vapor and less than 0.5 percent by weight steam with the remainder being liquid HTF.

The steam condensate from exchanger 156 is mixed with the brine from vessel 152. These partially-cooled geothermal fluids are pressurized by pump 164 and introduced into direct contact heat exchanger 166 wherein they are directly contacted with a n-pentane working fluid at a pressure of about 380 psia. The pressure of exchanger 166 and the composition of the working fluid have been selected to prohibit vaporization in exchanger 166 and yet permit the subsequent heating of the working fluid to a saturated or superheated vapor in indirect heat exchanger 176. Essentially no geothermal fluid is introduced into the working fluid stream, thus avoiding scaling and/or corrosion of the heat exchange surfaces of exchanger 176 or the internal surfaces of turbine 56.

The working fluid is preheated by direct contact with the partially-cooled geothermal fluid in exchanger 166 and is vaporized and partially superheated in exchanger 176. The working fluid vapor is expanded through turbine 56, thereby producing the mechanical energy to drive generator 58. The working fluid exhausted from the turbine is condensed and eventually recycled to exchanger 166.

It is readily apparent from this disclosure that the method of this invention is extremely versatile and can be utilized to produce mechanical energy from a wide variety of geothermal fluids by proper selection of the heat transfer fluid, working fluid and operating conditions. While particular embodiments of the invention have been described, it will be understood, of course, that the invention is not limited thereto since many obvious modifications can be made, and it is intended to include within this invention any such modification as will fall within the scope of the appended claims.

Having now described the invention, we claim:

1. A method for producing mechanical energy from the recoverable thermal energy of a hot geothermal fluid, which comprises:
   producing hot geothermal fluid from a subterranean geothermal reservoir;
   contacting at least a portion of said hot geothermal fluid in an initial contact step with a heat transfer fluid which is substantially immiscible with said geothermal fluid, thereby transferring a significant portion of said thermal energy to said heat transfer fluid and partially-cooling said geothermal fluid;
   thereafter contacting the partially-cooled geothermal fluid in a second contact step with a working fluid which is substantially immiscible with said geothermal fluid, thereby transferring the remainder of said recoverable thermal energy to said working fluid;
   further heating said working fluid by indirect heat exchange with said heat transfer fluid through a heat exchange surface; and
   utilizing the heated working fluid in a heat engine to produce mechanical energy;
   whereby the amount of geothermal fluid introduced into the heat engine and contacted with said heat exchange surface is minimized.

2. The method defined in claim 1 wherein between about 10 and about 60 percent of the recoverable thermal energy is transferred to said heat transfer fluid in said initial contact step.

3. The method defined in claim 1 wherein the geothermal fluid is a mixture including brine and steam, and including the steps of separating said steam from said brine prior to said initial contact step; further heating said working fluid prior to entry into said heat engine by indirect heat exchange with the separated steam, whereby the steam is condensed to form steam condensate; and mixing said steam condensate with said brine prior to said initial contact step.

4. The method defined in claim 1 wherein said partially-cooled geothermal fluid is contacted with said working fluid in said second contact step by countercurrent flow through at least two direct contact stages, and wherein said working fluid remains in the liquid state until at least the highest temperature stage of said second contact step.

5. The method defined in claim 1 wherein said heat transfer fluid is a normally liquid, paraffinic hydrocarbon having 5 or more carbon atoms per molecule, and including the steps of recycling said heat transfer fluid to said initial contact step in a closed loop; and selecting the composition of said heat transfer fluid and the pressure of said initial contact step such that said heat transfer fluid remains substantially in the liquid state throughout said closed loop.

6. The method defined in claim 1 wherein said heat transfer fluid is a normally liquid, paraffinic hydrocarbon having between 3 and 6 carbon atoms per molecule, and including the steps of recycling said heat transfer fluid to said initial contact step in a closed loop; and selecting the composition of said heat transfer fluid and the pressure of said initial contact step such that said heat transfer fluid is at least partially vaporized in said initial contact step.

7. The method defined in claim 1 wherein said hot geothermal fluid comprises a mixture of steam and brine, and including the steps of separating said steam from said brine to form separated steam and separated brine; contacting said separated steam with the heat transfer fluid in said initial contact step, thereby condensing said separated steam to form steam condensate; and mixing said steam condensate with said separated brine to form said partially-cooled geothermal fluid prior to said second contact step.

8. The method defined in claim 1 wherein said hot geothermal fluid comprises a mixture of steam and brine, and including the steps of separating said steam from said brine in a first flash stage to form a high pressure steam and a separated brine; reducing the pressure of said separated brine, thereby producing a mixture of low pressure steam and partially-cooled brine; separating said low pressure steam from said partially-cooled brine in a second flash stage; contacting said high pressure steam with said heat transfer fluid in a high pressure stage of said initial contact step, thereby condensing said high pressure steam to form a first steam condensate; contacting said low pressure steam with said heat transfer fluid in a low pressure stage of said initial contact step, thereby condensing said low pressure steam to form a second steam condensate; and mixing said second steam condensate with said partially-cooled brine to form said partially-cooled geothermal fluid.

9. The method defined in claim 1 including pressurizing the partially-cooled geothermal fluid prior to said second contact step.

10. The method defined in claim 1 including the step of maintaining said working fluid substantially in the liquid state during its direct contact with the partially-cooled geothermal fluid, and wherein said working fluid is a multicomponent fluid comprised of a mixture of normally liquid paraffinic hydrocarbons having between 3 and 6 carbon atoms per molecule.

11. The method defined in claim 1 wherein said working fluid is at least partially vaporized in said second step, and said working fluid is a normally liquid, paraffinic hydrocarbon having between 3 and 6 carbon atoms per molecule.

12. A method for producing mechanical energy from the recoverable thermal energy of a hot geothermal fluid, which comprises:
   producing hot geothermal fluid from a subterranean geothermal reservoir;
   contacting at least a portion of said hot geothermal fluid in an initial contact step with a heat transfer fluid comprised of a normally liquid, paraffinic hydrocarbon having 3 or more carbon atoms per molecule, or mixtures thereof, thereby transferring between about 10 and about 60 percent of said thermal energy to said heat transfer fluid and partially cooling said geothermal fluid;

thereafter contacting the partially-cooled geothermal fluid in a second contact step comprised of at least one direct contact heat exchange stage with a working fluid comprised of a normally liquid, paraffinic hydrocarbon having between 3 and 6 carbon atoms per molecule or mixtures thereof, thereby transferring the remainder of said recoverable thermal energy to said working fluid;

further heating said working fluid by indirect heat exchange with the heat transfer fluid from said initial contact step, whereby said working fluid is at least partially vaporized; and utilizing the heated working fluid in a heat engine to produce mechanical energy;

whereby the amount of geothermal fluid introduced into the heat engine is minimized.

13. The method defined in claim 12 wherein between about 15 and about 40 percent of the recoverable thermal energy is transferred to said heat transfer fluid in said initial contact step.

14. The method defined in claim 12 wherein the geothermal fluid comprises a mixture of brine and steam, and including the steps of separating said steam from said brine prior to said initial contact step; further heating said working fluid prior to entry into said heat engine by indirect heat exchange with the separated steam, whereby the steam is condensed to form steam condensate; and mixing said steam condensate with said brine prior to said initial contact step.

15. The method defined in claim 12 wherein said second contact step comprises at least two direct contact stages, and including the steps of recycling said working fluid to said second contact step in a closed loop; and selecting the composition of said working fluid and the pressures of said direct contact stages such that said working fluid remains in the liquid state at least until said working fluid is introduced into the highest temperature stage of said second contact step.

16. The method defined in claim 12 including the step of recycling said heat transfer fluid to said initial contact step in a closed loop.

17. The method defined in claim 12 wherein said hot geothermal fluid comprises a mixture of steam and brine, and including the steps of separating said steam from said brine in a first flash stage to form a high pressure steam and a separated brine; reducing the pressure of said separated brine, thereby producing a mixture of low pressure steam and partially cooled brine; separating said low pressure steam from said partially cooled brine in a second flash stage; contacting said high pressure steam with said heat transfer fluid in a high pressure stage of said initial contact step, thereby condensing said high pressure steam to form a first steam condensate; contacting said low pressure steam with said heat transfer fluid in a low pressure stage of said initial contact step, thereby condensing said low pressure steam to form a second steam condensate; and mixing said second steam condensate with said partially cooled brine to form said partially cooled geothermal fluid.

18. The method defined in claim 12 wherein said working fluid comprises a mixture of alkanes having between 3 and 6 carbon atoms per molecule, and including the step of selecting the pressure of said second contact step and the composition of said working fluid such that said working fluid remains substantially in the liquid state in said second contact step.

19. A method for producing mechanical energy from the recoverable thermal energy of a hot geothermal fluid, which comprises:

producing hot geothermal fluid from a subterranean geothermal reservoir at a pressure above its vapor pressure, thereby maintaining the geothermal fluid substantially in the liquid state;

contacting said geothermal fluid in an initial contact step with a substantially single component heat transfer fluid comprised of a normally liquid, paraffinic hydrocarbon having 5 or more carbon atoms per molecule or mixtures thereof, thereby transferring between about 10 and about 60 percent of said thermal energy to said heat transfer fluid and partially cooling said geothermal fluid;

thereafter contacting the partially-cooled geothermal fluid in a second contact step comprised of at least one direct contact heat exchange stage with a multi-component working fluid comprised of a mixture of alkanes having between 3 and 6 carbon atoms per molecule, the composition of said working fluid being selected and said direct contact stages being maintained at a pressure sufficient to substantially prohibit vaporization of said working fluid during its direct contact with said partially cooled geothermal fluid, thereby transferring the remainder of said recoverable thermal energy to said working fluid;

further heating said working fluid by indirect heat exchange with the heat transfer fluid from said initial contact step, whereby said working fluid is vaporized and said heat transfer fluid is cooled;

recycling said heat transfer fluid to said initial contact step;

utilizing the working fluid in a heat engine to produce mechanical energy, thereby condensing said working fluid; and recycling said working fluid to said second contact step.

20. A method for producing mechanical energy from the recoverable thermal energy of a hot geothermal fluid, which comprises:

producing hot geothermal fluid comprising a mixture of steam and brine from a subterranean geothermal reservoir;

separating said steam from said brine in a first flash stage to form a high pressure separated steam and high pressure separated brine;

contacting said high pressure separated steam in a first direct contact stage with a heat transfer fluid comprised of a normally liquid, paraffinic hydrocarbon having 5 or more carbon atoms per molecule or mixtures thereof, thereby condensing said high pressure separated steam to form a high pressure steam condensate;

reducing the pressure of said high pressure steam condensate and said high pressure separated brine to produce a low pressure steam and a low pressure brine;

separating said low pressure steam from said low pressure brine to form a low pressure separated steam and a low pressure separated brine;

contacting said low pressure separated steam in a second direct contact stage with said heat transfer fluid thereby condensing said low pressure separated steam to form a low pressure steam condensate, said heat transfer fluid being preheated in said second stage prior to entry into said first stage and wherein between about 10 to about 60 percent of said thermal energy is transferred to said heat transfer fluid in an initial contact step comprised of said first and second stages;

mixing said low pressure steam condensate with said low pressure separated brine to form a partially-cooled geothermal fluid;

pressurizing said partially cooled geothermal fluid to prevent subsequent flashing of steam therefrom;

contacting said partially cooled geothermal fluid in a second contact step comprised of at least one direct contact heat exchange stage with a working fluid comprised of an alkane having between 3 and 6 carbon atoms per molecule or mixtures thereof, thereby transferring the remainder of said thermal energy to said working fluid;

further heating said working fluid by indirect heat exchange with said heat transfer fluid, whereby said working fluid is at least partially vaporized and said heat transfer fluid is cooled;

recycling said heat transfer fluid to said initial contact step;

utilizing the working fluid in a heat engine to produce mechanical energy; and recycling said working fluid to said second contact step.

* * * * *